United States Patent [19]

Matsuura et al.

[11] Patent Number: 5,678,895
[45] Date of Patent: Oct. 21, 1997

[54] RECLINING DEVICE FOR SEAT

[75] Inventors: Hiroshi Matsuura; Fumio Ishikawa, both of Hamamatsu, Japan

[73] Assignee: Fuji Kiko Co., Ltd., Tokyo, Japan

[21] Appl. No.: 578,136

[22] Filed: Dec. 26, 1995

[30] Foreign Application Priority Data

| Dec. 27, 1994 | [JP] | Japan | 6-323477 |
| Dec. 28, 1994 | [JP] | Japan | 6-326603 |
| Jan. 31, 1995 | [JP] | Japan | 7-013614 |
| Jan. 31, 1995 | [JP] | Japan | 7-013616 |
| Jan. 31, 1995 | [JP] | Japan | 7-013617 |

[51] Int. Cl.⁶ .................................................. B60N 2/02
[52] U.S. Cl. ................................. 297/367; 297/366
[58] Field of Search ............................. 297/362, 361.1, 297/366, 367, 363

[56] References Cited

U.S. PATENT DOCUMENTS

| 4,087,885 | 5/1978 | Gillentine | 297/367 X |
| 4,384,744 | 5/1983 | Barley | 297/367 |
| 4,659,146 | 4/1987 | Janiaud | 297/367 |
| 4,789,205 | 12/1988 | Pipon et al. | 297/367 |
| 4,997,223 | 3/1991 | Croft | 297/367 |
| 5,161,856 | 11/1992 | Nishino | 297/363 X |
| 5,558,402 | 9/1996 | Yamada | 297/363 |

FOREIGN PATENT DOCUMENTS

| 2578602 | 9/1986 | France | 297/367 |
| 2651718 | 5/1977 | Germany | 297/363 |
| 2931873 | 2/1981 | Germany | 297/363 |

*Primary Examiner*—Milton Nelson, Jr.
*Attorney, Agent, or Firm*—Foley & Lardner

[57] ABSTRACT

A reclining device for a seat comprises a base plate secured to a seat cushion; and a pivotal plate pivotally connected through a center shaft to the base plate and secured to a seatback. The base plate has a guide portion which faces the pivotal plate. A toothed member is movably guided by the guide portion. The toothed member has a first toothed portion. A cam member is movably guided by the guide portion of the base plate. The cam member moves the toothed member in a first direction when moved in one direction and moves the toothed member in a second direction when moved in the other direction. The pivotal plate has a recess which faces the guide portion of the base plate. The recess has a second toothed portion to which the first toothed portion is engaged when the toothed member is moved in the first direction. An operation lever is pivotally connected through the center shaft to the base plate. A mechanism is used for moving the cam member in the one and the other directions when the operation lever is manipulated.

28 Claims, 11 Drawing Sheets

RECLINING DEVICE FOR SEAT

BACKGROUND OF THE INVENTION

1. Field of the Invention

The present invention relates in general to seats, and more particularly to reclining devices for automotive seats.

2. Description of the Prior Art

For providing seat occupants with comfortable sitting posture, so-called "reclining seats" are used particularly in the field of motor vehicles. In such seats, there is installed a reclining device which permits a seatback to take a desired angular locked position relative to a seat cushion.

Hitherto, various types of reclining devices have been proposed and put into practical use. Some of them are of a type including a first toothed member connected to the seat cushion, a second toothed member connected to the seatback, a cam member arranged to selectively establish and cancel engagement between the toothed members, and an operation lever for actuating the cam member. When, with the seatback being held in an angled locked position relative to the seatback, the operation lever is pivoted in one direction, engagement of the two toothed members is canceled thereby permitting the seatback to pivot to a new angled position relative to the seat cushion. When thereafter the operation lever is released, the two toothed members become mated at a new engaged position corresponding the new angled position of the seatback. With this, the seatback is locked at the new desired angular position.

However, due to its inherent construction, the above-mentioned conventional reclining device has the following drawbacks.

First, manipulation of the operation lever requires a marked force particularly when the seat is occupied. That is, under such condition, the manipulation has to be made against a marked force applied to the cam member from the seatback against which the back of a seat occupant is pressed. This phenomenon not only lowers the facility in handling the reclining device, but also hastens abrasion of the teeth of the two toothed members.

Second, due to numerous parts used therein, the entire of the reclining device is complicated and bulky in construction and costed high. Furthermore, due to assembly of the numerous parts in a limited space, degree of freedom in designing the reclining device is severely restricted.

SUMMARY OF THE INVENTION

It is therefore an object of the present invention to provide a reclining device for a seat, which is free of the above-mentioned drawbacks.

According to the present invention, there is provided a reclining device for a seat including a seat cushion and a seatback. The reclining device comprises a base plate secured to the seat cushion; a pivotal plate pivotally connected through a center shaft to the base plate and secured to the seatback; first means defining on the base plate a guide portion which faces the pivotal plate; a toothed member movably guided by the guide portion, the toothed member having a first toothed portion; a cam member movably guided by the guide portion, the cam member moving the toothed member in a first direction when moved in one direction and moving the toothed member in a second direction when moved in the other direction; second means defining on the pivotal plate a recess which faces the guide portion of the base plate, the recess having a second toothed portion to which the first toothed portion is engaged when the toothed member is moved in the first direction; an operation lever pivotally connected through the center shaft to the base plate; and third means for moving the cam member in the one and the other directions when the operation lever is manipulated.

DETAILED DESCRIPTION OF THE DRAWING

Other objects and advantages of the present invention will become apparent from the following description when taken in conjunction with the accompanying drawings, in which.

DETAILED DESCRIPTION OF THE EMBODIMENT

In the following, embodiments of the present invention will be described in detail with reference to the accompanying drawings.

Figure 1:
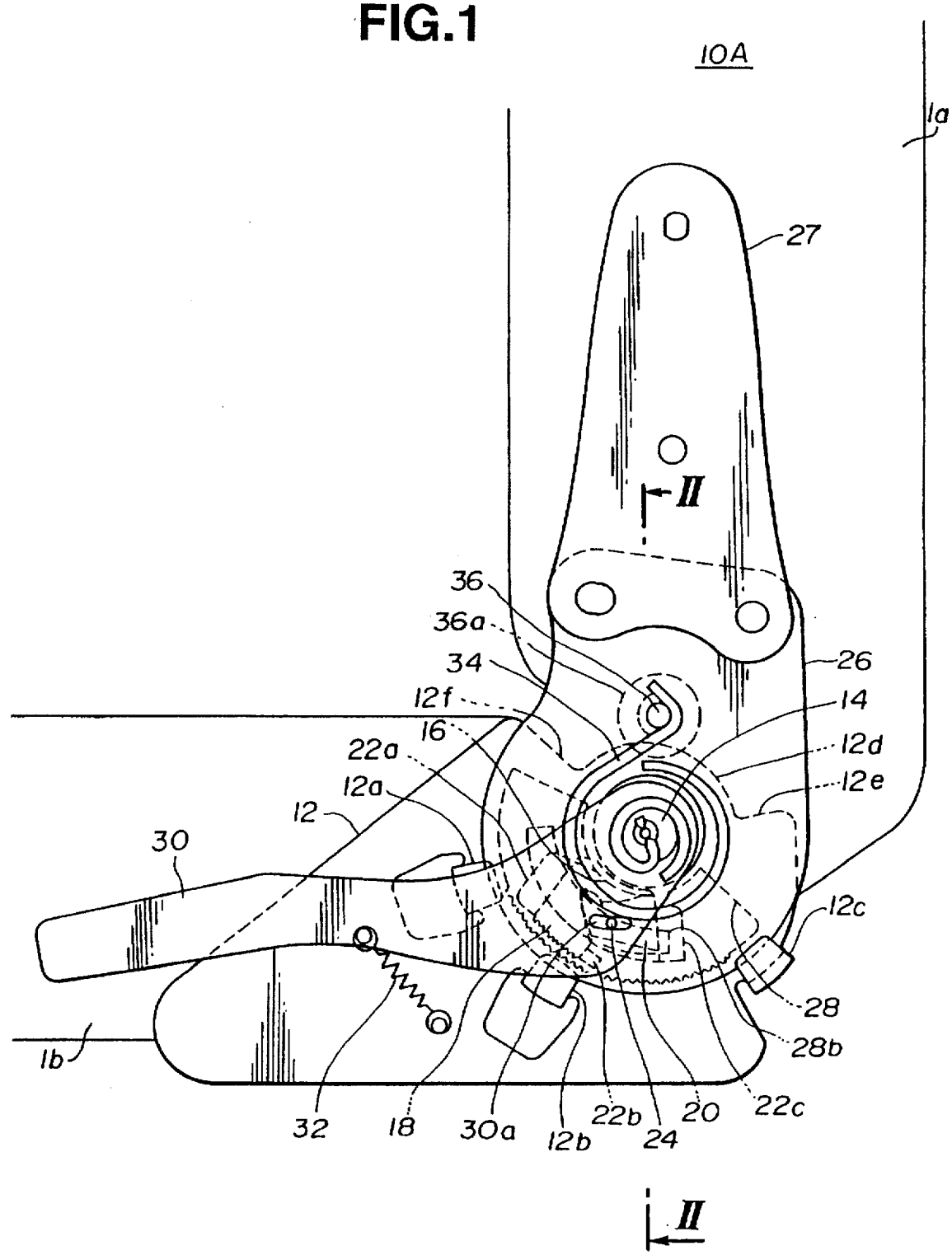
FIG. 1 is a front view of a reclining device, which is a first embodiment of the present invention.
Figure 2:
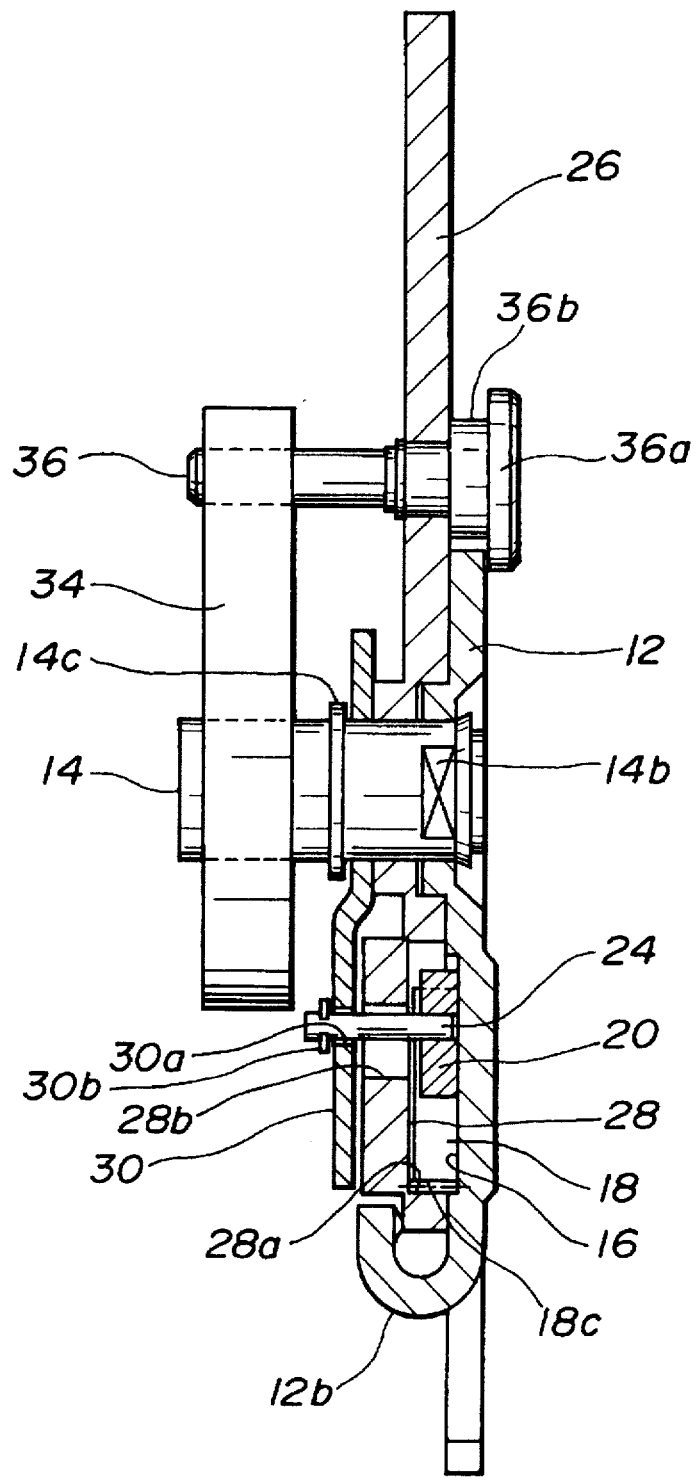
FIG. 2 is a sectional view taken along the line II—II of FIG. 1.
Figure 3:
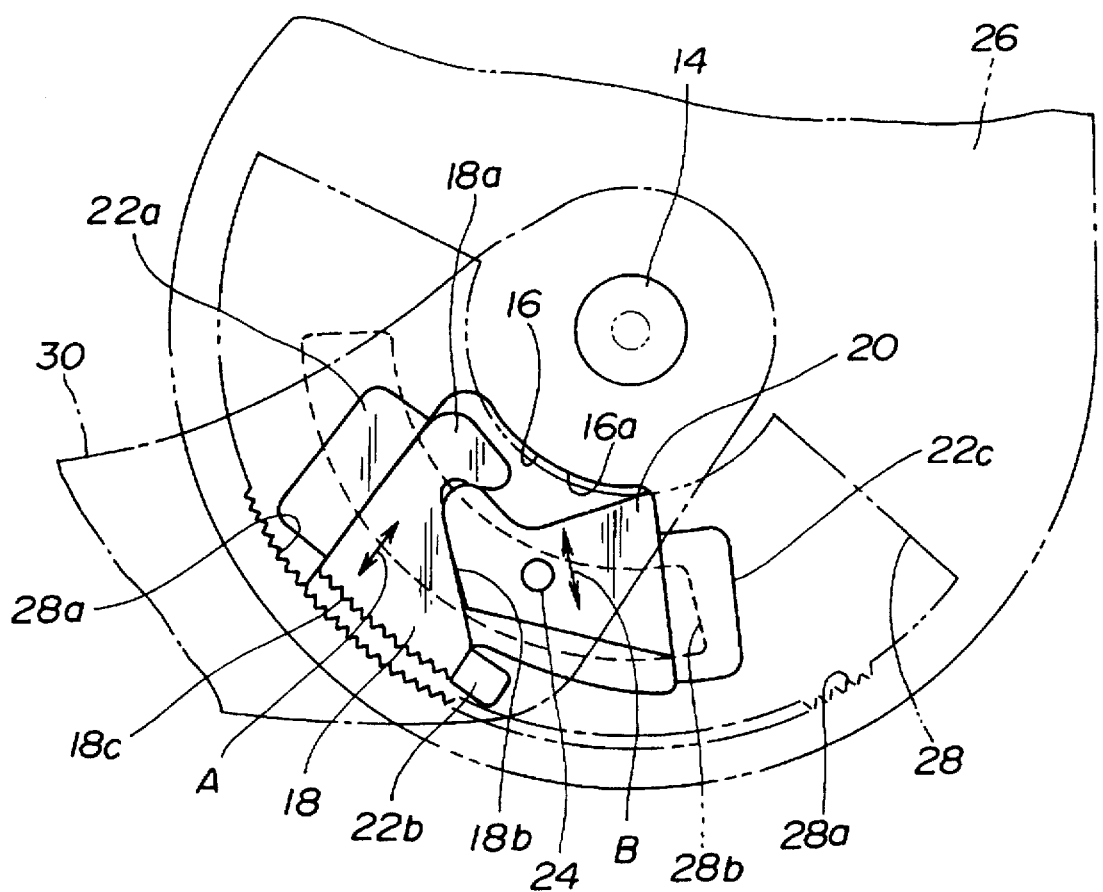
FIG. 3 is an enlarged view showing parts which constitute an essential portion of the reclining device of the first embodiment.

Referring to FIGS. 1 to 3, there is shown a reclining device 10A for an automotive seat, which is a first embodiment of the present invention.

It is to be noted that the reclining device 10A shown in the drawings is a unit mounted to a left rear side of an associated seat having a seatback 1a and a seat cushion 1b, such as a driver's seat.

As is seen from FIGS. 1 and 2, the reclining device 10A comprises a base plate 12 which is generally triangular in shape. Although not shown in the drawings, the base plate 12 is secured to a rear left side of a seat cushion of the seat.

As is best shown in FIG. 2, a center shaft 14 is secured at its one end to the base plate 12. For this securing, caulking technique is used. That is, an inner end 14a of the center shaft 14 is caulked for the connection to the base plate 12. For assuring the tight connection therebetween, a front portion 14b of the center shaft 14 is shaped to have an oval cross section and thrust in a corresponding oval opening formed in the base plate 12. Denoted by numeral 14c is a stopper ring which is integrally formed on the center shaft 14 for the purpose which will become apparent hereinafter.

As is seen from FIGS. 2 and 3, the base plate 12 is formed at its outer surface with a shallow recess 16 for the purpose which will be described hereinafter.

As is seen in FIG. 3, three projections (or embossed portions) 22a, 22b and 22c are formed on the outer surface of the base plate 12, which partially bound the recess 16. The recess 16 has an arcuate inner wall 16a which is concentric with the center shaft 14.

A generally triangular toothed member 18 is movably put in the shallow recess 16 with its major portion projected from the recess 16. The toothed member 18 is movable in a radial direction in the recess 16, that is, in the direction of the arrow "A" of FIG. 3. During the radial movement of the toothed member 18, the projections 22a and 22b serve as guides for the toothed member 18.

The toothed member 18 comprises a small head portion 18a directed toward the center shaft 14, a slanted side 18b facing the projection 22c and a toothed arcuate outer side 18c facing radially outwardly.

Within the shallow recess 16, there is further put a cam member which is movable in the direction of the arrow "B". That is, during the movement of the cam member 20, the projection 22c and the slanted side 18b of the toothed member 18 serve as guides for the cam member 20. The cam member 20 has a pin 24 secured thereto.

As is seen from FIGS. 1 and 2, a pivotal plate 26 is rotatably disposed at its circular base portion about the center shaft 14. An upper portion of the pivotal plate 26 is secured to an arm member 27 (see FIG. 1) which is secured to a left lower side of a seatback (not shown).

Due to provision of a spiral spring 34, the pivotal plate 26 is biased to pivot in a counterclockwise direction in FIG. 1. That is, an inner end of the spring 34 is hooked to the center shaft 14 and an outer end of the same is hooked to a holder pin 36 secured to the pivotal plate 26.

As is seen from FIG. 2, an enlarged head portion 36a of the holder pin 36 provides a guide means 36b which, upon pivotal movement of the pivotal plate 26, runs on and along an upper semicircular peripheral portion 12d (see FIG. 1) of the base plate 12 while guiding the plate 26. The upper semicircular peripheral portion 12d is concentric with the center shaft 14. The upper semicircular peripheral portion 12d has stepped ends 12e and 12f which serve as stopper means for suppressing excessive pivot movement of the pivotal plate 26.

The circular base portion of the pivotal plate 26 is slidably held by three lugs 12a, 12b and 12c which are pressed out of the base plate 12. The circular base portion of the pivotal plate 26 is formed at its inner surface with a sectoral recess 28 which is concentric with the center shaft 14.

As is understood from FIGS. 2 and 3, an arcuate outer wall of the sectoral recess 28, which faces the toothed arcuate outer side 18c of the toothed member 18, is formed with teeth 28a. That is, when the toothed member 18 is slid radially outward to its outermost position, the teeth 18c of the toothed member 18 are brought into engagement with the teeth 28a of the sectoral recess 28 of the pivotal plate 26.

The sectoral recess 28 is formed at its bottom with an arcuate slot 28b which is concentric with the center shaft 14.

As is seen from FIG. 2, the above-mentioned pin 24 from the cam member 20 passes through the arcuate slot 28b of the pivotal plate 26 and engages with an operation lever 30 in the following manner.

As is seen from FIGS. 1 and 2, the operation lever 30 is rotatably disposed at its base portion about the center shaft 14. The base portion is slidably put on the circular base portion of the pivotal plate 26, as shown. Due to provision of the above-mentioned stopper ring 14c, the operation lever 30 is reliably held on the center shaft 14.

The pin 24 extending from the cam member 20 through the arcuate slot 28b of the pivotal plate 26 is led into a small arcuate slot 30a formed in the base portion of the operation lever 30. As is seen in FIG. 2, a stop ring 30b is fixed to a projected end of the pin 24 to prevent disconnection between the pin 24 and the operation lever 30.

As is understood from FIG. 1, the small arcuate slot 30a is eccentric to the center shaft 14. That is, the distance between the slot 30a and the axis of the center shaft 14 gradually increases as the distance from the right end (as viewed in the drawing) of the slot 30a increases.

Thus, it will be appreciated that when the operation lever 30 is pulled upward, the pin 24 is forced to slide rightward in the slot 30a moving the cam member 20 (see FIG. 3) and thus the toothed member 18 radially inward, resulting in that the toothed arcuate outer side 18c of the toothed member 18 is drawn and thus separated from the teeth 28a of the pivotal plate 26. Under this condition, the pivotal plate 26 can pivot freely relative to the base plate 12.

A return spring 32 extends between the base plate 12 and the operation lever 30 to bias the latter to pivot counterclockwise in FIG. 1 about the center shaft 14.

For assembling the reclining device 10A, the operation lever 30 and the pivotal plate 26 are put on the center shaft 14 to provide a subassembly, and after the toothed member 18 and the cam member 20 are put into the shallow recess 16 of the base plate 12, the subassembly is mounted to the base plate 12 having the center shaft 14 caulked thereto.

In the following, operation of the reclining device 10A will be described with reference to FIG. 1. For ease of understanding, the description will be commenced with respect to one stable condition of the seat wherein the seatback assumes a certain angular locked position relative to the seat cushion.

In this stable condition, the pin 24 from the cam member 20 takes a leftmost position in the small arcuate slot 30a of the operation lever 30 and the toothed member 18 is kept engaged with the teeth 28a of the pivotal plate 26.

When now the operation lever 30 is pulled upward against the force of the return spring 32, the pin 24 is moved to its rightmost position in the arcuate slot 30a moving the cam member 20 (see FIG. 3) radially inward in the shallow recess 16 of the base plate 12. The inward movement of the cam member 20 induces a separation of the toothed member 18 from the teeth 28a of the pivotal plate 26. Thus, while the operation lever 30 is kept pulled, the seatback to which the pivotal plate 26 is secured can pivot freely. More specifically, due to work of the spiral spring 34, the seatback is inclined forward. When thereafter the seatback is pivoted back to a desired angular position and the operation lever 30 is released, the operation lever 30 is pivoted down due to the force of the return spring 32. Due to this downward movement of the operation lever 30, the pin 24 is forced to slide leftward in the arcuate slot 30 causing both the cam member 20 and the toothed member 18 to move radially outward, resulting in that the toothed member 18 becomes in engagement with the teeth 28a of the pivotal plate 26 at a new position. Thus, under this condition, the seatback takes a new angular locked position relative to the seat cushion.

In the following, advantages of the first embodiment 10A of the present invention will be described.

First, the inward movement of the cam member 20, which induces separation of the toothed member 18 from the teeth 28a of the pivotal plate 26, is effected by practically utilizing the principles of the lever and fulcrum in the connection between the small arcuate slot 30a and the pin 24. Thus, the operation lever 30 can be manipulated or pulled up with a reduced operation force.

Second, when the seat is in use, the load applied to the seatback by a seat occupant is mainly supported by the three projections 22a, 22b and 22c of the base plate 12 through the toothed member 18 and the cam member 20. Thus, the seatback can take a desired angular locked position without play. Under the locked condition of the seatback, no load is applied to the operation lever 30. Thus, manipulation of the operation lever 30 for unlocking the seatback is easily carried out with a light force.

Third, due to provision of the lugs 12a, 12b and 12c of the base plate 12 and the enlarged head portion 36a of the holder pin 36 and their associated parts, the pivoting movement of the pivotal plate 26 is assuredly and smoothly made without play. Furthermore, undesired separation of the pivotal plate 26 from the base plate 12 is assuredly suppressed.

Fourth, the pivotal plate 26 and the operation lever 30 are intimately put on the base plate 12 at their base portions without putting any members therebetween. Thus, the operation lever 30 and the pivotal plate 26 are prevented from suffering play.

Fifth, due to provision of the projections 22a and 22b of the base plate 12, the radial movement of the toothed member 18 is assured. This means assured engagement and disengagement between the toothed member 18 and the teeth 28a of the pivotal plate 26.

Referring to FIGS. 4 to 11, there is shown a reclining device 10B for an automotive seat, which is a second embodiment of the present invention.

It is to be noted that the reclining device 10B shown in the drawings is a unit mounted to a rear left side of the associated seat.

Figure 4:
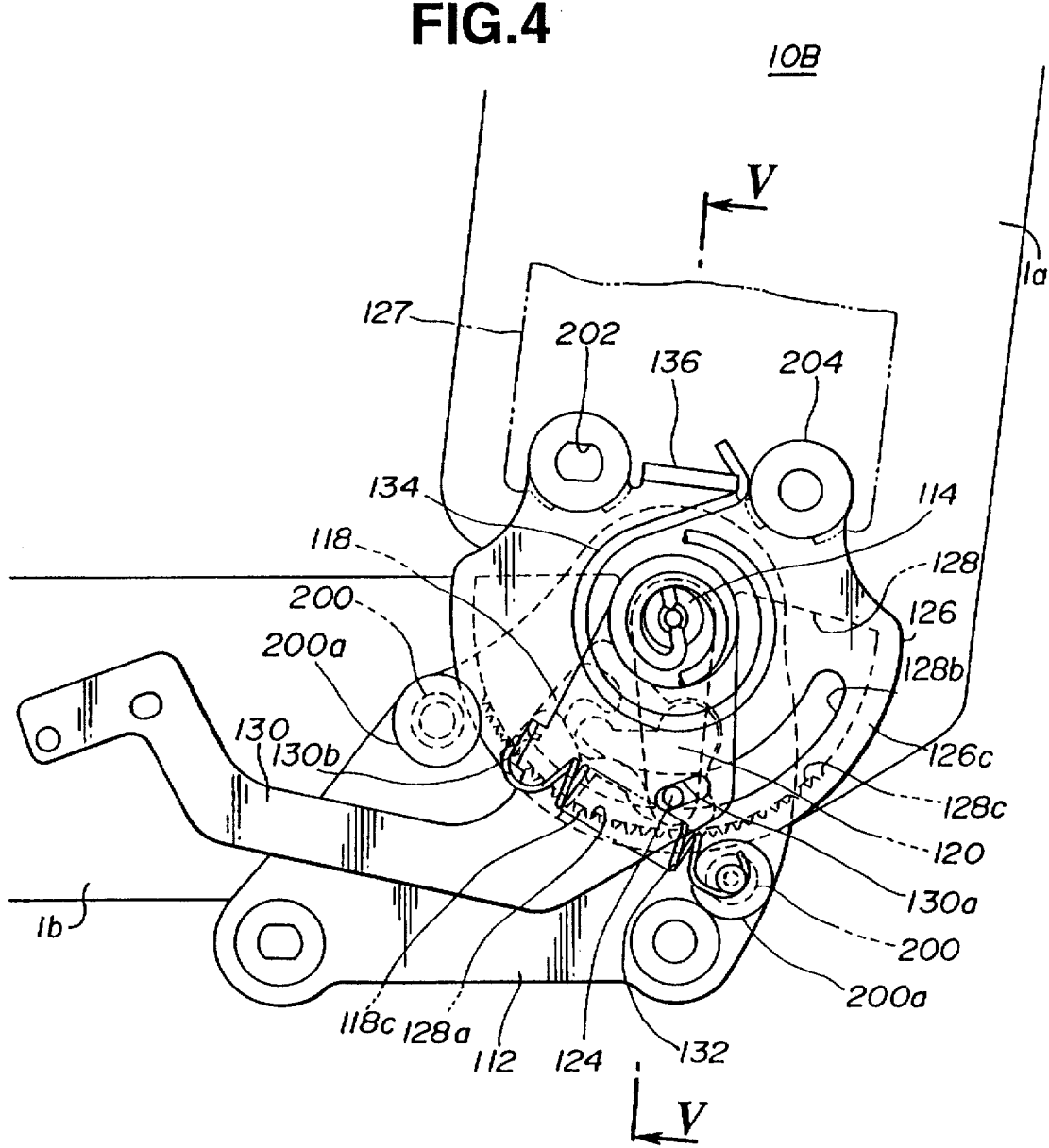
FIG. 4 is a front view of a reclining device, which is a second embodiment of the present invention.
Figure 5:
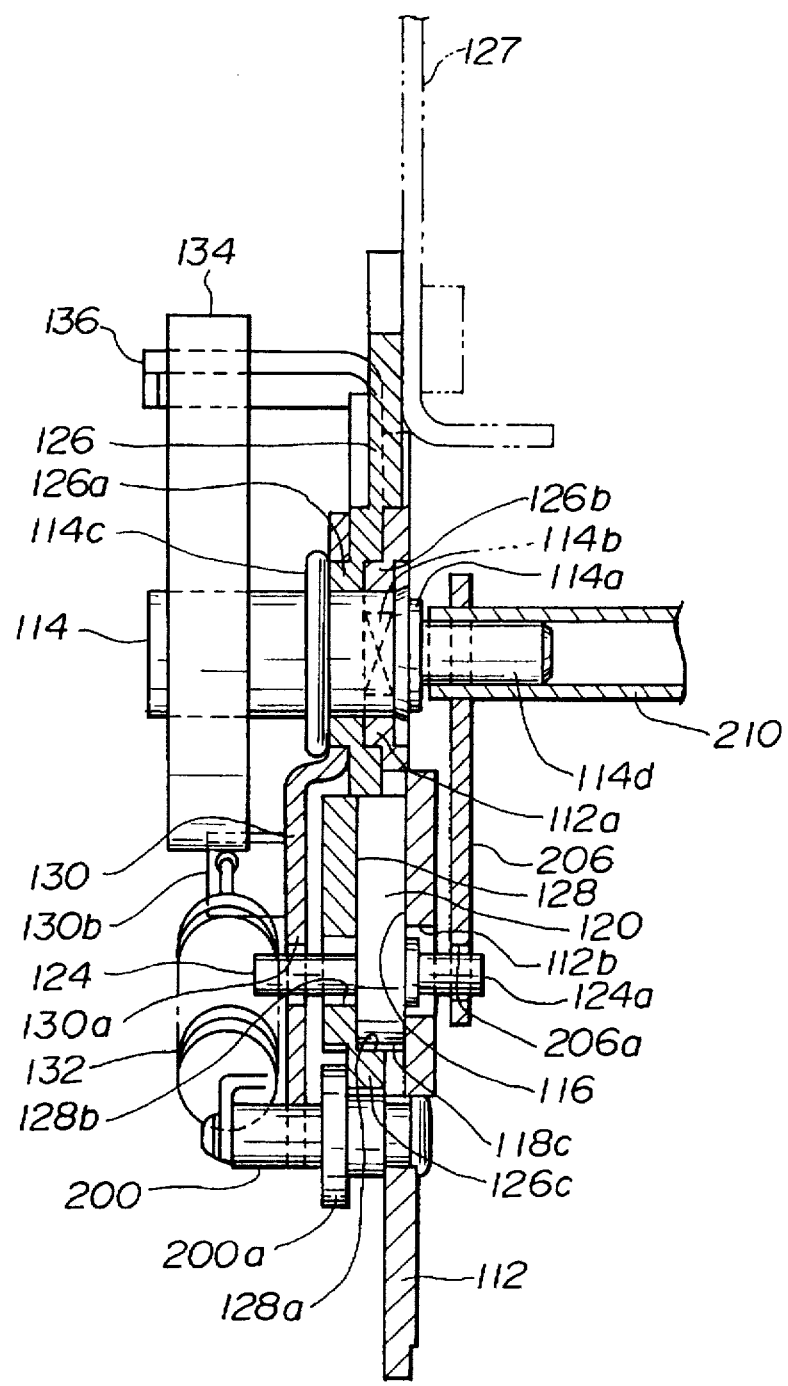
FIG. 5 is a sectional view taken along the line V—V of FIG. 4.

As is seen from FIGS. 4 and 5, the reclining device 10B comprises a base plate 112 which is generally triangular in shape. Although not shown in the drawings, the base plate 112 is secured to a rear left side of a seat cushion of the seat.

As is seen from FIG. 5, a center shaft 114 is secured at its one end to the base plate 112. For this securing, caulking technique is employed. That is, an inner end 114a of the center shaft 114 is caulked for the connection to the base plate 112. For assuring the tight connection therebetween, a front portion 114b of the center shaft 114 is shaped to have an oval cross section and thrust in a corresponding oval opening formed in the base plate 112. Denoted by numeral 114c is a stopper ring which is integrally formed on the center shaft 114 for the purpose which will become apparent hereinafter.

As is seen from FIGS. 5 and 6, the base plate 112 is formed at its outer surface with a recess 116 for the purpose which will be described hereinafter.

Figure 6:
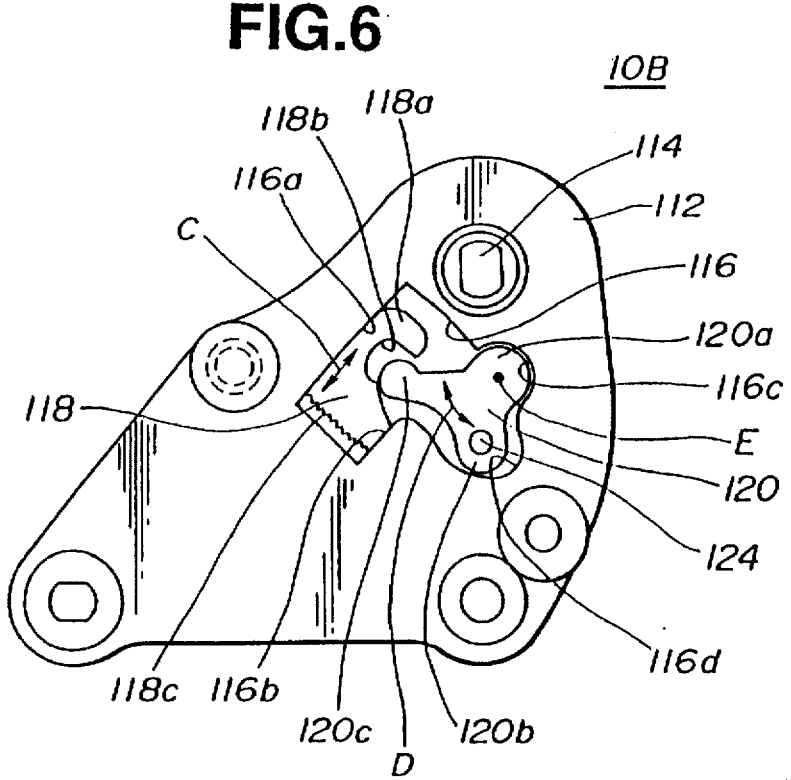
FIG. 6 is an enlarged view showing parts which constitute an essential portion of the reclining device of the second embodiment.
Figure 7:
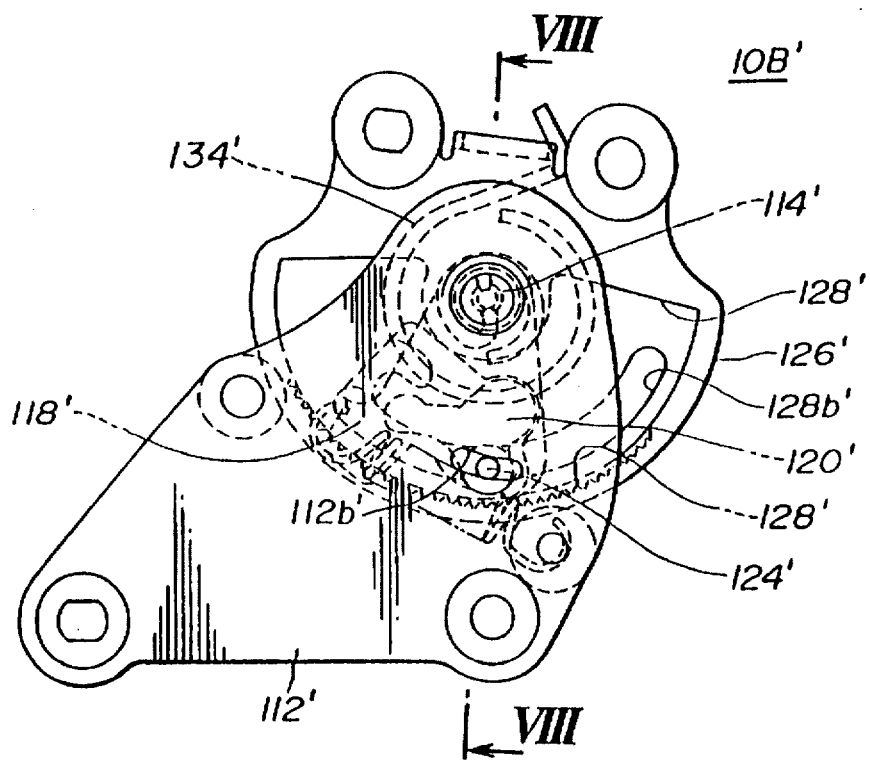
FIG. 7 is a front view of a reclining device which, upon assembly to a seat, can serve as a counter device for the reclining device of the second embodiment.
Figure 8:
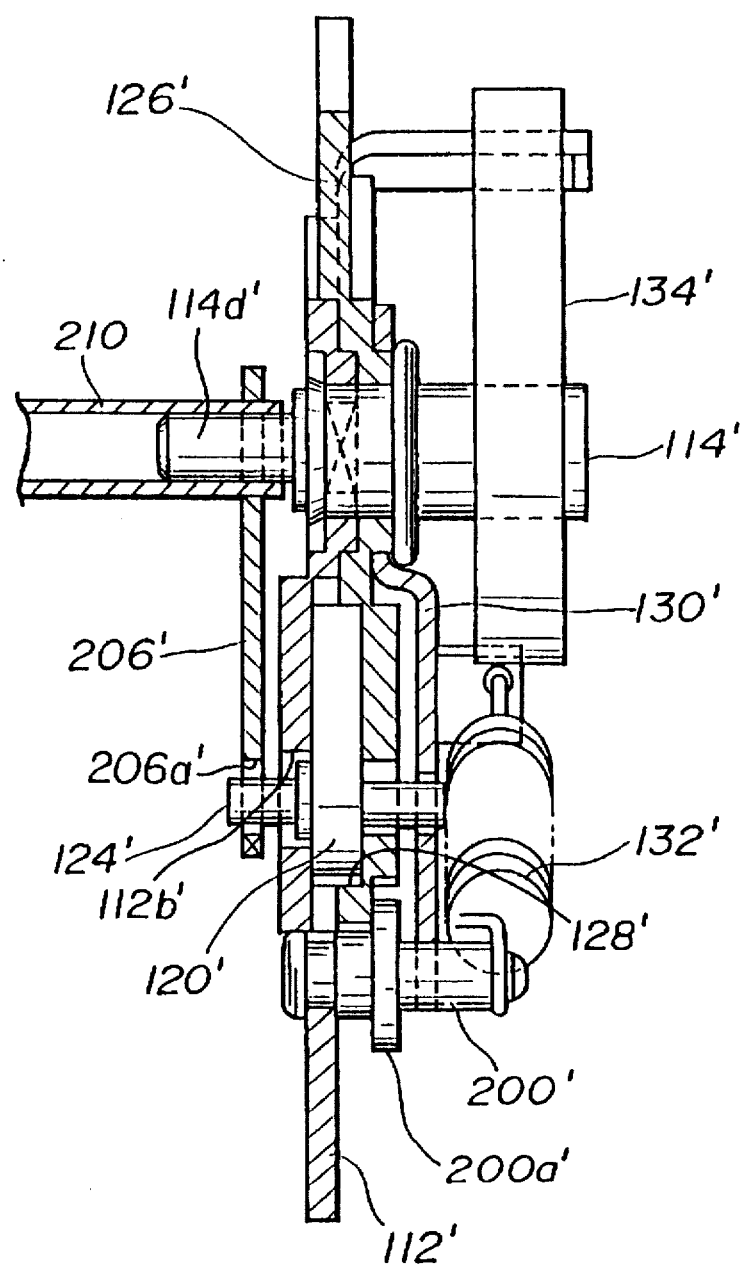
FIG. 8 is a sectional view taken along the line VIII—VIII of FIG. 7.

As is seen from FIG. 6, the recess 116 has a generally L-shape and comprises opposed parallel walls 116a and 116b and first and second concave walls 116c and 116d, which partially bound the recess 116.

A toothed member 118 is movably put in the recess 116 with its major portion projected from the recess 116. The toothed member 118 is movable in a radial direction in the recess 116, that is, in the direction of the arrow "C" of FIG. 6. For this radial movement, the toothed member 118 has parallel sides which slidably contact the opposed parallel walls 116a and 116b of the recess 116. That is, during the movement, the opposed parallel walls 116a and 116b serve as guides for the toothed member 118.

The toothed member 118 comprises a small head portion 118a directed toward the center shaft 114, a rounded recess 118b facing the second concave wall 116d of the recess 116 and a toothed arcuate outer side 118c facing radially outwardly.

As is shown in FIG. 6, within the recess 116 of the base plate 112, there is further received a cam member 120 which is movable in the direction of the arrow "D". The cam member 120 comprises a rounded pivot portion 120a which is slidably and intimately put in the first concave part 116c of the recess 116, a guided rounded part 120b which slidably contacts the second concave wall 116d of the recess 116 and a rounded work part 120c which is slidably engaged with the toothed member 118. That is, the cam member 120 can pivot about a center point denoted by reference "E" with which the first concave wall 116c of the recess 116 is concentric. The cam member 120 has at the guided rounded part 120b thereof a pin 124 secured thereto.

As is seen from FIGS. 4 and 5, a pivotal plate 126 is rotatably disposed at its circular base portion 126a about the center shaft 114. An upper portion of the pivotal plate 126 is secured to a left lower side of a seatback frame 127. Denoted by numerals 202 and 204 in FIG. 4 are connecting portions through which the pivotal plate 126 is bolted to the seatback frame 127.

As is seen from FIG. 5, the circular base portion 126a of the pivotal plate 126 is somewhat raised and has at its inboard surface a circular recess 126b which intimately and rotatably receives therein a circular boss 112a formed on the base plate 112. The circular boss 112a has the center shaft 114 secured thereto. An outer surface of the raised circular base portion 126a slidably contacts the stopper ring 114c of the center shaft 114, as shown.

Due to provision of a spiral spring 134, the pivotal plate 126 is biased to pivot in a counterclockwise direction in FIG. 4. That is, an inner end of the spring 134 is hooked to the center shaft 114 and an outer end of the same is hooked to a lug 136 pressed out of the pivotal plate 126.

As is seen from FIGS. 4 and 5, two pins 200 are secured to the base plate 112. Each pin 200 (see FIG. 5) has an enlarged ring 200a spaced from the base plate 112. The pivotal plate 126 has a semicircular lower portion 126c whose periphery slidably contacts inner surfaces of the enlarged rings 200a of the pins 200 upon pivotal movement of the pivotal plate 126. That is, during the pivoting movement of the pivotal plate 126, the enlarged rings 200a serve as a guide means. The periphery of the semicircular lower portion 126c of the pivotal plate 126 is concentric with the center shaft 114.

The semicircular lower portion of the pivotal plate 126 is formed at its inner surface with a sectoral recess 128 which is concentric with the center shaft 114.

As is seen from FIG. 4, an arcuate outer wall of the sectoral recess 128, which faces the toothed arcuate outer side 118c of the toothed member 118, is formed with teeth 128a. That is, when the toothed member 118 is slid radially outward to its outermost position, the teeth 118c of the toothed member 118 are brought into engagement with the teeth 128a of the sectoral recess 128 of the pivotal plate 126.

The sectoral recess 128 is formed at its bottom wall with an arcuate slot 128b which is concentric with the center shaft 114.

As is seen from FIG. 5, the above-mentioned pin 124 from the cam member 120 passes through the arcuate slot 128b of the pivotal plate 126 and engaged with an operation lever 130 in the following manner.

As is seen from FIGS. 4 and 5, the operation lever 130 is rotatably disposed at its base portion about the above-mentioned raised circular base portion 126a of the pivotal plate 126. Due to provision of the stopper ring 114c on the center shaft 114, the operation lever 130 is reliably held on the base portion 126a of the pivotal plate 126.

The pin 124 extending from the cam member 120 through the arcuate slot 128b of the pivotal plate 126 is led into a small arcuate slot 130a formed in the base portion of the operation lever 130.

As is understood from FIG. 4, the small arcuate slot 130a is eccentric to the center shaft 114. That is, the distance between the slot 130a and the axis of the center shaft 114 gradually increases as the distance from the right end (as viewed in the drawing) of the slot 130a increases.

Thus, it will be appreciated that when the operation lever 130 is pulled upward, the pin 124 is forced to slide rightward in the slot 130a pivoting the cam member 120 (see FIG. 6) about the center point "E" clockwise and thus the toothed member 118 is drawn and thus separated from the teeth 129a of the pivotal plate 126. Under this condition, the pivotal plate 126 can pivot freely relative to the base plate 112.

A return spring 132 extends between the one of the pins 200 of the base plate 112 and a raised part 130b of the operation lever 130 to bias the lever 130 to pivot counter-clockwise in FIG. 4 about the axis of the center shaft 114.

As is understood from FIG. 5, the pin 124 of the cam member 120 has an integral part 124a which extends rightward in the drawing. The integral part 124a passes through an arcuate slot 112b formed in the base plate 112. Although not shown in the drawings, the arcuate slot 112b is shaped to be concentric with the center point "E" (see FIG. 6) about which the cam member 120 pivots. The integral part 124a through the arcuate slot 112b is pivotally connected with a link lever 206 which will be described in detail hereinafter.

Figure 9:
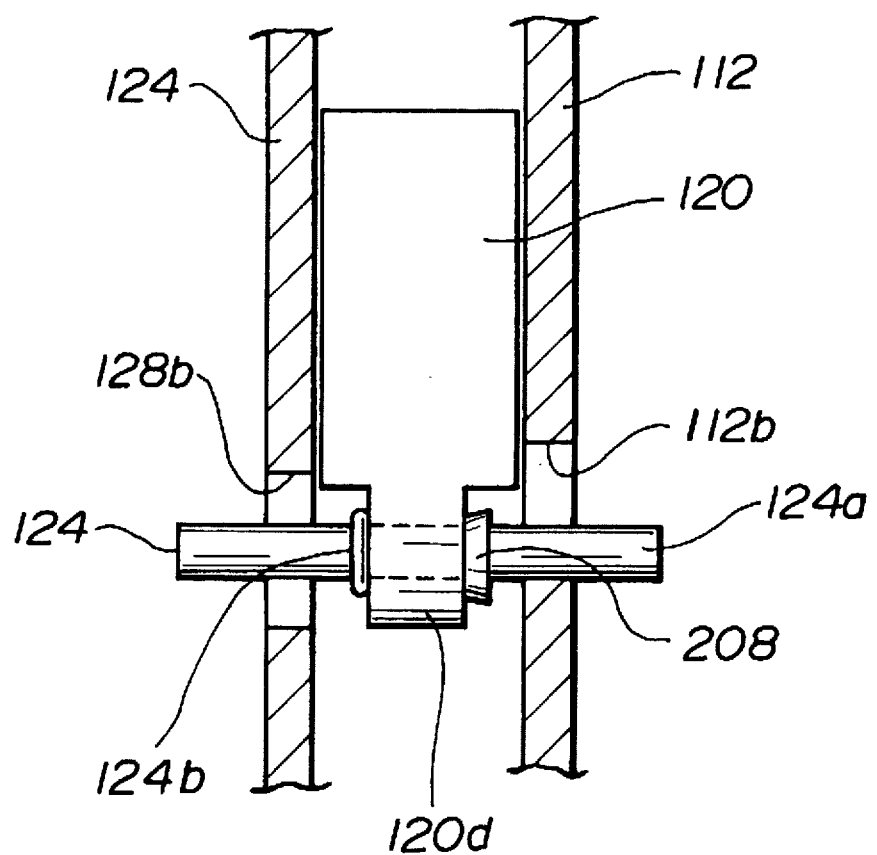
FIG. 9 is an enlarged sectional view showing a cam member and its associated parts employed in the second embodiment.

The manner of connection of the pin 124 to the cam member 120 is clearly shown in FIG. 9. In fact, for the connection, caulking technique is used. As shown in the drawing, the cam member 120 has a reduced part 120d through which the pin 124 passes. A stopper ring 124b is integrally formed on the pin 124 and a separate metal ring 208 is disposed on the pin 124 as shown. For the connection, the metal ring 208 is pressed or caulked.

Referring back to FIG. 5, the center shaft 114 has a concentric stud 114d which extends rightward in the drawing. A connecting pipe 210 is coaxially and rotatably connected to the stud 114d. The above-mentioned link lever 206 is secured to the connecting pipe 210. For the pivotal connection between the link lever 206 and the pin 124, the link lever 206 is formed with a an opening 206a with which the pin 124 is engaged. The size of the opening 206a is somewhat larger than the diameter of the pin 124. Thus, when, due to manipulation of the operation lever 130, the pin 124 is moved, the connecting pipe 210 is rotated through the link lever 206.

Figure 12:
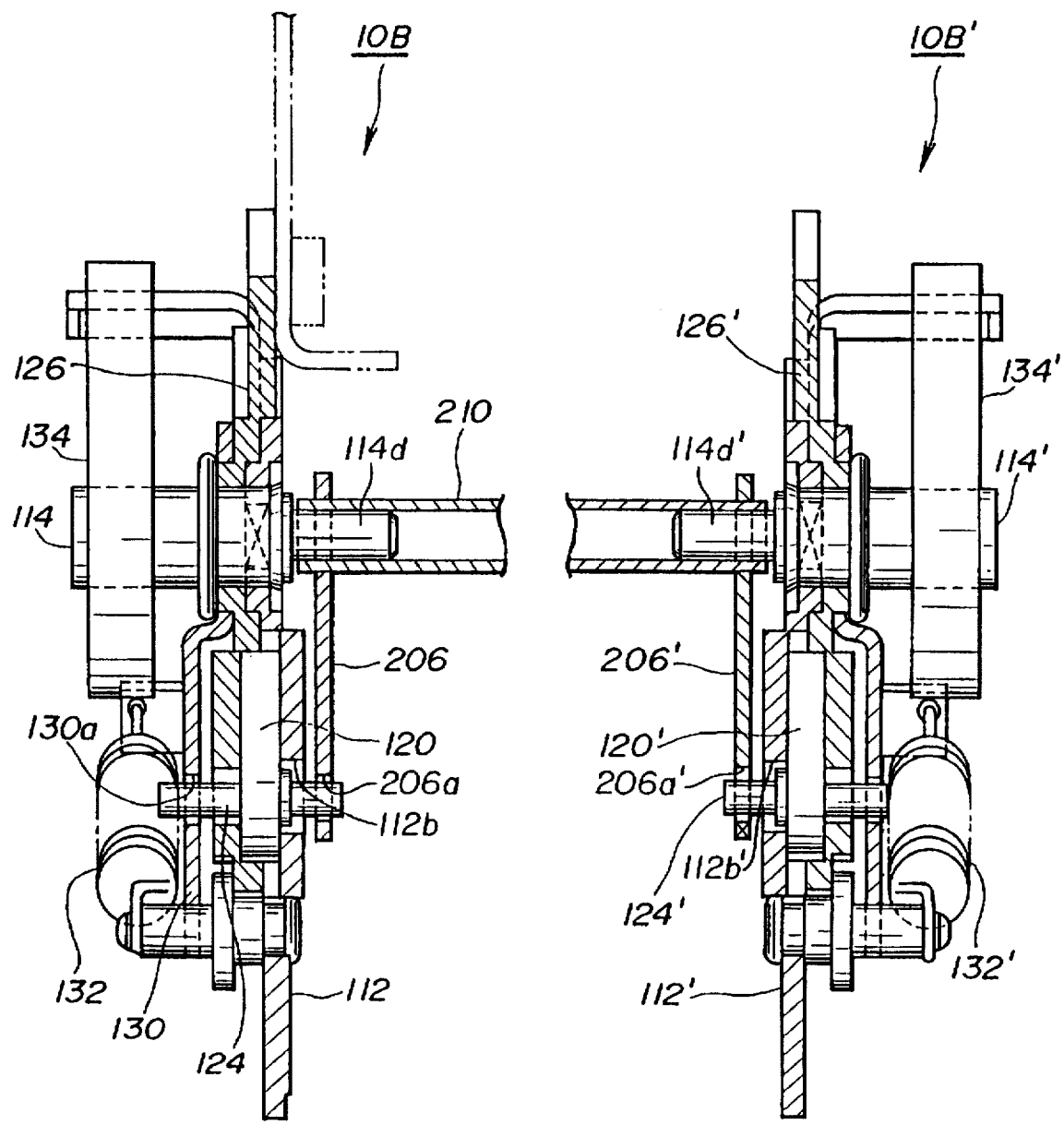
FIG. 12 is a front view of the reclining device of the second embodiment and the counter device of the same, which are operatively connected through a conning pipe.
Figure 13:
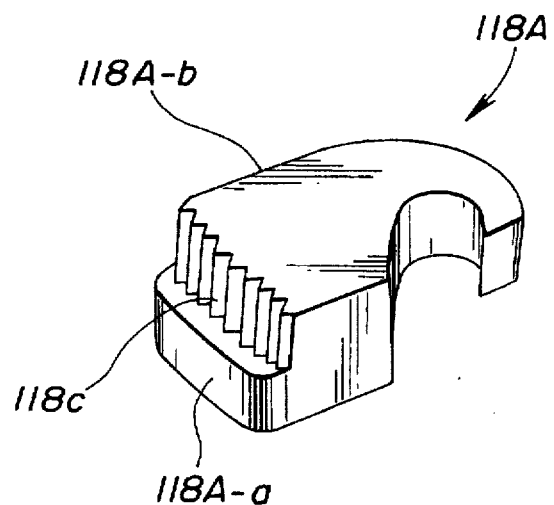
FIGS. 13 to 16 are perspective, sectional and exploded views of various toothed members which are usable in the present invention.

As is seen from FIG. 12, the connecting pipe 210 extends to another reclining device 10B' which is to be mounted to a rear right side of the seat.

The device 10B' is substantially the same in construction as the above-mentioned device 10B except orientation of parts. Thus, description of the device 10B' will be omitted. However, for ease of understanding, parts of the device 10B' will be indicated by the addition of "'" after each corresponding numeral. To the right end of the connecting pipe 210, there is connected a link lever 206' of the device 10B', which corresponds to the link lever 206 of the device 10B.

Figure 14:
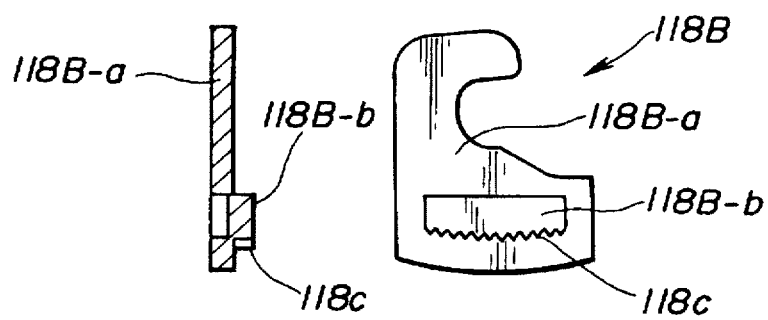
Figure 15:
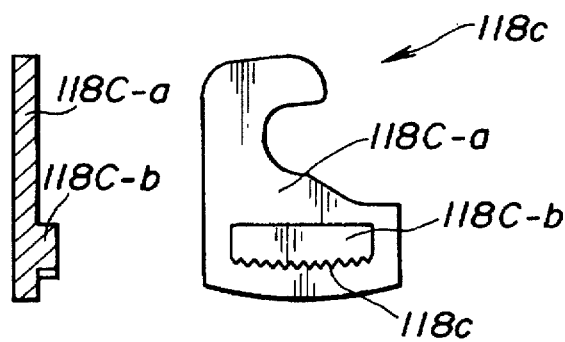
Figure 16:
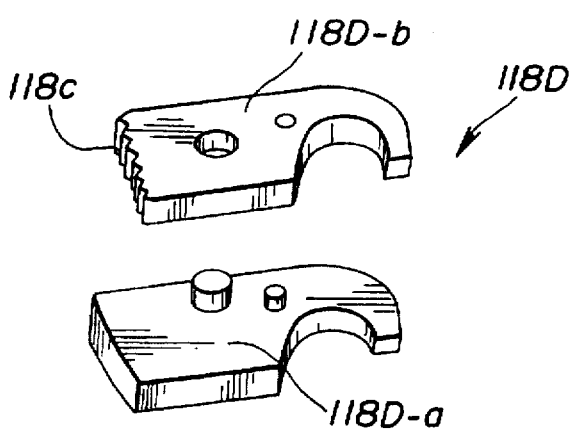

Modified toothed members 118A, 118B, 118C and 118D are shown in FIGS. 13, 14, 15 and 16. The toothed member 118A of FIG. 13 has a one piece structure and comprises a larger base portion 118A–a which is neatly and slidably received in the recess 116 of the base plate 112 and a smaller toothed portion 118A–b which is projected from the recess 116. The portion 118B–b is formed with the teeth 118c which are engageable with the teeth 128a of the pivotal plate 126. The toothed member 118B of FIG. 14 is of a pressed plate member. That is, the toothed member 118B comprises a flat base portion 118B–a which is slidably received in the recess 116 of the base plate 112 and a pressed projection 118B–b whose one side is formed with the teeth 118c. The toothed member 118C of FIG. 15 is of a casted member which comprises a base portion 118C–a and a projected portion 118C–b. The projected portion 118C–b is formed at its one side with the teeth 118c. The toothed member 118D of FIG. 16 comprises a base member 118D–a and a toothed member 118D–b which are coupled via a so-called pin connection. For this connection, the base member 118D–a is formed with first and second pins (no numerals) and the toothed member 118D–b is formed with first and second openings (no numerals). Upon coupling, the pins are mated with the openings. The toothed member 118D–b is formed with the teeth 118c, as shown.

In the following, operation of the reclining device 10B will be described with reference to FIGS. 4, 10 and 11. For ease of understanding, the description will be commenced with respect to one stable condition of the seat wherein the seatback assumes a certain angular locked position relative to the seat cushion.

Figure 10:
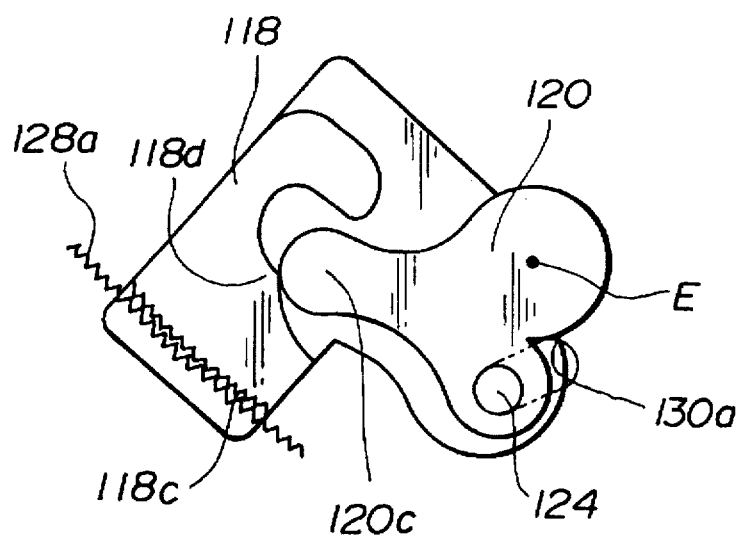
FIG. 10 is an enlarged view showing a toothed member and cam member which constitute an essential portion of the reclining device of the second embodiment.
Figure 11:
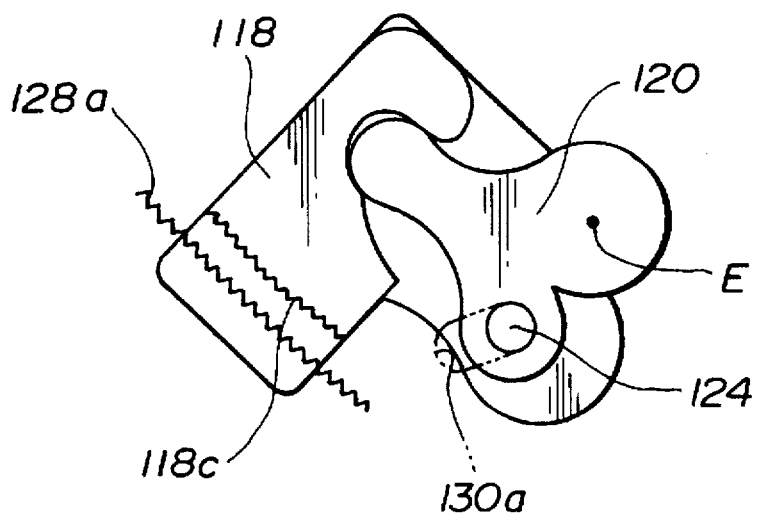
FIG. 11 is a view similar to FIG. 10, but showing a different condition.

In this stable condition, as is seen from FIG. 10, the pin 124 from the cam member 120 takes a leftmost position in the small arcuate slot 130a of the operation lever 130 and the toothed member 118 is kept engaged with the teeth 128a of the pivotal plate 126.

When now the operation lever 130 is pulled upward against the force of the return spring 132, the pin 124 is moved to its rightmost position in the arcuate slot 130a pivoting the cam member 120 (see FIG. 6) clockwise in FIG. 6 about the center point "E". As is well seen from FIG. 11, the clockwise movement of the cam member 120 induces a separation of the toothed member 118 from the teeth 128a of the pivotal plate 126. Thus, while the operation lever 130 is kept pulled up, the seatback to which the pivotal plate 126 is secured can pivot freely. More specifically, due to work of the spiral spring 134, the seatback is inclined forward upon manipulation of the operation lever 130. When thereafter the seatback is pivoted back to a desired angular position and the operation lever 130 is released, the operation lever 130 is pivoted down due to the force of the return spring 132. Due to this downward movement of the operation lever 130, the pin 124 is forced to slide leftward in the arcuate slot 130 causing the cam member 120 (see FIG. 6) to pivot counter-clockwise in FIG. 6 about the center point "E". Thus, the toothed member 118 is moved radially outward resulting in that the toothed member 118 becomes in engagement with the teeth 128a of the pivotal plate 126 at a new position. Thus, under this condition, the seatback takes a new angular locked position relative to the seat cushion.

It is to be noted that when the toothed member 118 is in engagement with the teeth 128a of the pivotal plate 126, the rounded work part 120c of the cam member 120 abuts against a raised part 118d of the toothed member 118 as shown in FIG. 10. This abutment brings about a locked engagement between the toothed member 118 and the cam member 120 thereby assuring the locked condition of the new angular position of the seatback.

In the following, operation of the other reclining device 10B' will be briefly described with reference to FIGS. 4, 7, 8, 9 and 12.

When the operation lever 130 (see FIGS. 4 and 12) is pulled up, the pin 124 is moved in the arcuate slot 130a in a manner as has been described hereinabove. The movement of the pin 124 is transmitted through the link lever 206 to the connecting pipe 210 to pivot the same about its axis. The pivoting movement of the connecting pipe 210 is transmitting through the link lever 206' to the pin 124' of the other reclining device 10B'. Thus, for the same reason as has been described hereinabove, the cam member 120' separates the toothed member 118' (see FIG. 7) from the teeth 128' of the pivot plate 126'. Thus, upon manipulation of the operation lever 130, both the reclining devices 10B and 10B' assume their unlocking condition thereby bring about unlocked condition of the seatback. Under this condition, the seatback can be pivoted freely to a desired angular position. When the operation lever 130 is released, both the devices 10B and 10B' assume their locking condition and thus the seatback becomes locked at the desired angular position.

In the following, advantages of the second embodiment 10B (10B') of the present invention will be described.

First, the counterclockwise movement of the cam member 120, which induces separation of the toothed member 118 from the teeth 128a of the pivotal plate 126, is effected by practically utilizing the principles of the lever and fulcrum in the connection between the small arcuate slot 130a and the pin 124. Thus, the operation lever 130 can be manipulated or pulled up with a reduced operation force.

Second, when the seat is in use, the load applied to the seatback by a seat occupant is mainly supported by the toothed member 118 and the cam member 120 which are kept locked seen from FIG. 10. Thus, the seatback can take a desired angular locked position without play. Under the locked condition of the seatback, no load is applied to the operation lever 130. Thus, manipulation of the operation lever 130 for unlocking the seatback is easily carried out with a light force.

Third, due to provision of the pins 200 each having an enlarged ring 200a by which, as is seen from FIGS. 4 and 5, the semicircular lower portion 126c of the pivotal plate 126 is slidably guided. Thus, the pivoting movement of the pivotal plate 126 is assuredly and smoothly made without play. Due to provision of the pins 200 and the stopper ring 114c formed on the center shaft 114, undesired separation of the pivotal plate 126 from the base plate 112 is assuredly suppressed.

Fourth, since the toothed member 118 and the cam member 120 are received in a space defined by both the recess 116 of the base plate 112 and the recess 128 of the pivotal plate 126, the thickness of the reclining device 10B or 10B' can be reduced.

Fifth, the recess 128a of the pivotal plate 126 for receiving the toothed member 118 and the cam member 120 serves as a means for defining the teeth 128a. This induces a compact construction of the reclining device.

Sixth, when, as is shown in FIG. 12, the two reclining devices 10B and 10B' are applied to a seat, a synchronous mechanism therebetween is easily and compactly constructed. In fact, the synchronous mechanism comprises only the pins 124 and 124', the link levers 206 and 206', the studs 114d and 114d' and the connecting pipe 210.

Seventh, as is seen from FIGS. 13 to 16, the teeth 118c of the toothed member 118A, 118B, 118C or 118D are formed on only a depressed wall part of the body of the toothed member. That is, as is understood from FIG. 13, a larger base portion 118A–a is left below the toothed portion 118c, which is neatly and slidably received in the recess 116 of the base plate 112. Such construction can provide the toothed member 118A, 118B, 118C or 118D with smoothed movement in the recess 116. Furthermore, machining of such construction is relatively easy.

Eighth, the pivotal plate 126 and the operation lever 130 are intimately put on the base plate 112 at their base portions without putting any members therebetween. Thus, the operation lever 130 and the pivotal plate 126 are prevented from suffering play.

Ninth, since the base plate 112 has a larger area against which the inner end portion of the operation lever 130 is pressed, a stable supporting of the operation lever 130 is established without using any smoothing member, such as washer or the like.

Tenth, since the pivotal plate 126 is intimately put on the base plate 112, the engagement between the toothed member 118 and the teeth 128a of the pivotal plate 126 is assuredly made.

What is claimed is:

1. A reclining device for a seat including a seat cushion and a seatback, said reclining device comprising:
   a base plate adapted to be secured to said seat cushion;
   a pivotal plate adapted to be pivotally connected through a center shaft to said base plate and secured to said seatback;
   a guide portion on said base plate which faces said pivotal plate;
   a toothed member movably guided by said guide portion, said toothed member having a first toothed portion;
   a cam member movably guided by said guide portion, said cam member moving said toothed member in a first direction when moved in one direction and moving said toothed member in a second direction when moved in the other direction;
   a recess on said pivotal plate which faces said guide portion of said base plate, said recess having a second toothed portion to which said first toothed portion is engaged when said toothed member is moved in said first direction;
   an operation lever pivotally connected through said center shaft to said base plate; and
   a mechanism for moving said cam member in said one and the other directions when said operation lever is manipulated.

2. A reclining device as claimed in claim 1, in which said guide portion of said base plate is a recess defined on said base plate.

3. A reclining device as claimed in claim 1, in which said toothed member is of a one-piece structure and comprises:

a larger base portion slidably guided by said guide portion of said base plate; and a smaller toothed portion raised from said larger base portion, said smaller toothed portion having said first toothed portion formed thereon.

4. A reclining device as claimed in claim 1, in which said toothed member is of a pressed plate member and comprises:

a flat base portion slidably guided by said guide portion of said base plate; and a pressed projection raised from said flat base portion leaving a recess behind said pressed projection, said pressed projection having said first toothed portion formed thereon.

5. A reclining device as claimed in claim 1, in which said toothed member is of a casted member and comprises:

a flat base portion slidably guided by said guide portion of said base plate; and a projected portion raised from said flat base portion, said projected portion having said first toothed portion formed thereon.

6. A reclining device as claimed in claim 1, in which said toothed member comprises:

a base member slidably guided by said guide portion of said base plate;

a toothed body detachably mounted on said base member; and a pin connection structure through which said base member and said toothed body are detachably connected.

7. A reclining device as claimed in claim 6, in which said pin connection structure comprises:

first and second pins formed on said base member; and first and second openings formed in said toothed body to receive therein said first and second pins respectively.

8. A reclining device as claimed in claim 1, further comprising:

a stopper ring integrally formed on said center shaft;

a first annular raised portion of said pivotal plate, said first annular raised portion having an opening through which said center shaft passes, said first annular raised portion having an outer surface to which said stopper ring contacts; and a second annular raised portion of said base plate, said second annular raised portion having an opening to which said center shaft is connected through caulking, said second annular raised portion being slidably received in a circular recess defined behind said first annular raised portion.

9. A reclining device as claimed in claim 8, in which said operation lever has a circular opening which is slidably received on said first annular raised portion of said pivotal plate.

10. A reclining device as claimed in claim 1, in which said mechanism for moving comprises:

an arcuate slot in said operation lever, said arcuate slot being eccentric to said center shaft; and a pin secured to said cam member, said pin having a portion slidably received in said arcuate slot.

11. A reclining device as claimed in claim 10, further comprising:

an arcuate slot in said base plate through which an extension part of said pin passes, said arcuate slot being concentric with said center shaft;

a link lever having one end pivotally connected to said extension part of said pin;

a connecting pipe arranged to rotate about the axis of said center shaft, said connecting pipe having one end to which the other end of said link lever is secured; and an auxiliary reclining device to which the other end of said connecting pipe is operatively connected.

12. A reclining device as claimed in claim 10, in which said cam member has a reduced part through which said pin passes, and in which two stopper rings are provided on said pin to tightly put therebetween said reduced part.

13. A reclining device as claimed in claim 12, in which one of said stopper rings is integrally formed on said pin and the other stopper ring is caulked to be connected to said pin.

14. A reclining device as claimed in claim 13, in which the distance between outer surfaces of the two stopper rings is smaller than the thickness of a major body portion of said cam member.

15. A reclining device as claimed in claim 10, further comprising a resilient mechanism for biasing said operation lever to pivot in a direction to move said cam member in said one direction.

16. A reclining device as claimed in claim 15, further comprising an arcuate slot in said pivotal plate through which said pin passes, said arcuate slot of the pivotal plate being concentric with said center shaft.

17. A reclining device as claimed in claim 16, in which each of said first and second toothed portions is concentric with said center shaft.

18. A reclining device as claimed in claim 17, further comprising a guide for smoothly guiding the pivoting movement of the said pivotal plate relative to said base plate.

19. A reclining device as claimed in claim 18, in which said guides comprises:

a plurality of spaced lugs formed on said base plate, said lugs being arranged on a circle which is concentric with said center shaft; and a semicircular lower portion of said pivotal plate, which slidably contacts said lugs.

20. A reclining device as claimed in claim 18, in which said guide means comprises:

a headed pin secured to said pivotal plate to move therewith, the head of the pin being spaced from said pivotal plate; and a semicircular upper portion of said base plate which is concentric with said center shaft, a periphery of said semicircular upper portion being put in the space defined by said head of the headed pin.

21. A reclining device as claimed in claim 1, in which said center shaft is secured to said base plate by caulking.

22. A reclining device as claimed in claim 21, in which said center shaft has a non-circular cross section and in which said base plate has a noncircular opening into which said center shaft is received.

23. A reclining device as claimed in claim 1, in which said toothed member is arranged to move straight.

24. A reclining device as claimed in claims 23, in which said cam member is arranged to move straight.

25. A reclining device as claimed in claim 24, in which said toothed member has a slanted side against which a portion of said cam member slidably abuts.

26. A reclining device as claimed in claim 23, in which said cam member is arranged to move pivotally.

27. A reclining device as claimed in claim 26, in which said cam member is arranged to rotate about a given point in the guide portion of said base plate.

28. A reclining device as claimed in claim 27, in which said toothed member has a rounded recess with which a rounded work part of said cam member is slidably engaged.

* * * * *